Dec. 17, 1935.   J. C. CURTIS   2,024,432
GUIDE SHELL FOR ROCK DRILLS
Filed May 16, 1932
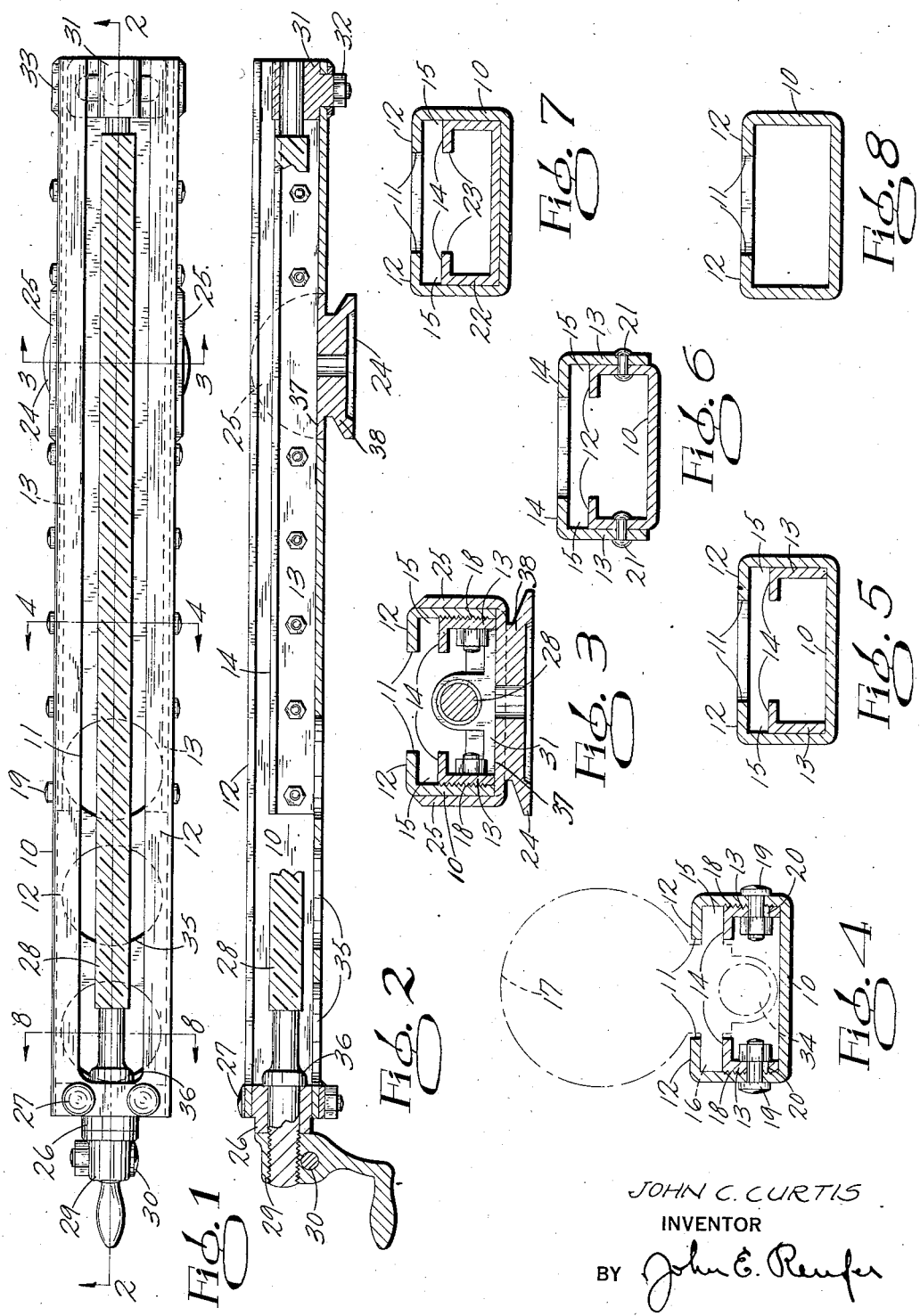
JOHN C. CURTIS
INVENTOR
BY John E. Reufer
ATTORNEY Patented Dec. 17, 1935

2,024,432

UNITED STATES PATENT OFFICE 2,024,432

GUIDE SHELL FOR ROCK DRILLS

John C. Curtis, Cleveland, Ohio, assignor to The Cleveland Rock Drill Company, Cleveland, Ohio, a corporation of Ohio Application May 16, 1932, Serial No. 611,555

3 Claims. (Cl. 308—3)

This invention relates broadly to rock drills, but is more particularly concerned with guide shells which serve as mountings for rock drills of the drifter type.

One of the objects of this invention is to produce a guide shell for rock drills comprising a restricted number of parts, thus reducing the cost of manufacture and maintenance.

Another object of this invention is to reduce the weight of the guide shell to a minimum and obtain a sturdy shell which will be capable of withstanding the severe strains to which shells of this type are subjected.

Other objects and advantages more or less ancillary to the foregoing and the manner in which the various objects are attained reside in the specific construction and aggroupment of the elements peculiar to this structure, as will become apparent from a more complete examination of this specification, in the claims of which there are assembled certain specific constructions indicative of the scope and spirit of the invention.

In the drawing which illustrates a preferred embodiment of the invention:

Fig. 1 is a plan view of a guide shell assembly.

Fig. 2 is a longitudinal sectional view of the guide shell taken in a plane indicated by line 2—2 in Fig. 1.

Fig. 3 is a cross sectional view taken in a plane indicated by line 3—3 in Fig. 1. Fig. 4 is a cross sectional view of the guide shell taken in a plane indicated by line 4—4 in Fig. 1. The dot and dash lines indicate the position of the drilling motor when assembled with the guide shell.

Figs. 5, 6, and 7 are views similar to Fig. 4, illustrating modifications of the invention.

Fig. 8 is a cross sectional view taken in a plane indicated by line 8—8 in Fig. 1.

Referring to the drawing in which like characters indicate corresponding parts throughout the several views, 10 represents the main member of the guide shell. This member is preferably obtained by machining a piece of rectangular tubing. The central portion of the upper wall of the tube 10 is cut away to provide a slot 11 extending approximately the full length of the tube. The remaining portions of that wall form two top plates 12, the purpose of which will be explained later. Adjacent these top plates, there is secured against each side wall of the tube 10 an L shaped angle plate 13, with the short side 14 extending inwardly in parallel alignment with the top plates 11 and forming therewith a channel defining a groove 15 within which the flanges 16 of the drill body 17, are free to slide. The angle plates may be secured to the tube by a plurality of transversely disposed bolts 19. To compensate for wear due to the longitudinal displacement of the drilling motor's flanges 16 within the grooves 15 and upon the side 14, the width of the groove may be adjustable. For that purpose, the apertures provided in the angle plates 13 for allowing the passage of the bolts 19, are elongated as at 20, permitting thereby the angle plate 13 to be moved toward or away from the top plate 12 and maintain thereby the width of the grooves 15 substantially equal to the width of the flanges 16. To provide for an even adjustment of the angle plates, there is provided on the respective engaging surfaces of the tube and the angle plates, a plurality of longitudinally disposed teeth or serrations 18, which are parallel and in close relation with each other. When it is desired to reduce the width of the groove 15, the angle plate 13 may be moved upward a distance equal to the width of one tooth, thus affording a step by step adjustment of the angle plate 13.

Fig. 5 illustrates a modification of the invention in which the angle plates 13 are secured to the side walls of the tube 10, by spot welding the two together. This spot welding may be repeated at regular intervals along the entire length of the angle plates, assuring thereby a perfect integral assembly.

Fig. 6 illustrates another modification of the invention in which the angle plates 13 are positioned on the exterior of the tube 10. In this instance the tube is made of a rectangular cross section being shorter in height than the tube illustrated in Fig. 4 and Fig. 5. The angle plates 13 may be secured to the side walls of the tube by means of rivets 21. The side 14 of the angle plates 13 forms now the upper wall of the channel 15, while the remaining portion 12 of the upper wall of the tube, forms the lower wall of the channel.

Fig. 7 illustrates still another modification of the invention in which the lower wall 14 of the channel 15 is obtained by introducing within the rectangular tube 10 a smaller rectangular tube 22. The upper wall of this tube is provided with a cut away portion defining a slot 23 corresponding to the slot 11 provided in the upper wall of the rectangular tube 10. The tube 22 may be secured within the tube 10 in any suitable manner, it may be welded, riveted, or bolted in place.

Toward the front end of the guide shell, a portion of the lower wall of the tube 10 is cut away, thus forming a rectangular opening adapted to receive the bottom wall 37 of a member 38 which is formed with two parallel side walls 25 disposed in straddle relation with the tube 10, for reinforcing and preventing the spreading of the side walls thereof. The member 38 is integrally welded to the tube 10, and is formed with a conical portion 24 depending therefrom by which the shell may be affixed to any suitable support.

The extreme left end portion of the upper wall of the tube 10 is kept solid to prevent the spreading of the side walls of the tube toward that end. Mounted within that same end of the tube 10, there is a bushing 26 being secured therein by a pair of transversely disposed bolts 27. Rotatably mounted within the bushing 26 there is one end of a feed screw 28. The longitudinal displacement of the feed screw is prevented by its integral collar 36, and a handle 29, disposed in abutting relation with each end of the bushing 26. The handle 29 is secured on the feed screw 28 and is locked against relative rotation thereon by the co-operation of a clamping bolt 30. The other end of the feed screw 28 is journaled within a stationary bushing 31 secured within the right end of the tube 10 by a pair of bolts 32. To reinforce the extreme right end of the tube 10, there is welded thereon a band 33. The drilling motor is provided with an internal threaded portion 34 within which the feed screw 28 is capable of engagement. Consequently, when the feed screw is rotated, its rotative movement is transformed into a longitudinal movement of the drilling motor within the channels 15. To reduce the weight of the assembly, the bottom wall of the tube 10 is provided with a plurality of openings or apertures 35.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. A support for rock drill comprising an elongated shell of a rectangular cross section, adjustable guide ways within said shell within which the rock drill is slidably mounted, the upper wall of said shell being partly cut away to permit said rock drill to extend from said guide ways to the exterior of said shell, and a member having walls extending the full height of the shell secured thereto in straddle relation therewith to prevent the spreading of said guide ways, said member having a conical portion protruding from the lower wall of said shell for engagement with a supporting frame.

2. A guide shell for rock drill comprising a duality of tubes of rectangular cross section disposed one within the other, a clearance between the upper wall of each of said tubes constituting guideways of rectangular cross section within which the corresponding guides of the rock drill are free to slide, and a slot within the upper wall of one of said tubes allowing the passage of said guides into said guideways.

3. A guide shell for rock drill comprising an external and an internal tube both of rectangular cross section, the extent of the external height of said internal tube being less than that of the internal height of said external tube, providing thereby a clearance between the upper wall of each of said tubes constituting guideways of rectangular cross section within which the corresponding guides of the rock drill are free to slide, and a slot within the upper wall of said external tube through which the portion of the rock drill extending therefrom to said guides is free to slide.

JOHN C. CURTIS.